United States Patent Office 3,248,279
Patented Apr. 26, 1966

3,248,279
CELLULOSIC PRODUCTS TREATED WITH SOLUBLE CATIONIC (METHYLENEDIPHENYL ETHER) POLYMERS
Gerald R. Geyer, Midland, Mich., assignor to The Dow Chemical Company, Midland, Mich., a corporation of Delaware
No Drawing. Filed Sept. 30, 1963, Ser. No. 312,282
20 Claims. (Cl. 162—138)

This invention relates to cellulosic products having incorporated therewith a small but effective amount of a soluble cationic (methylenediphenyl ether) polymer. More particularly, it relates to the manufacture of paper having improved wet strength, dry strength, and electroconductive properties as a result of treatment with a soluble (methylenediphenyl ether) polymer having active cationic groups chemically bonded to the polymer matrix.

Large quantities of non-cellulose additives are used by the paper industry each year to improve the properties of the finished paper. The search for more effective additives to improve such properties as wet and dry strength, filler retention, printability, and softness or "hand," continues. Of particular interest has been the use of synthetic resins and polymers in the processing and treatment of paper. For example, addition of hydrolyzed polyacrylamide is recommended to increase the dry strength of paper by Azorlosa in Canadian Patent 477,265. The use of linear vinylaromatic polymers as sizing and bonding agents is described by Jen and House in United States Patent 3,015,605.

Most recently, the surging popularity of electrostatic copying as a method for office duplication has created demands for special photoconductive copy paper. The Electrofax process requires a photoconductive paper which is also electroconductive. At moderate and high humidities, the moisture content of the copy paper usually suffices to provide the needed electroconductivity. However, at low relative humidities and particularly at relative humidities of less than about 25 percent at normal temperatures, the electroconductivity of conventional paper stock is too low for effective printing by the Electrofax process.

Considerable research has been devoted to developing coatings or treatments for paper to provide the necessary electroconductivity at low relative humidities. Particularly desirable is an electroconductive additive which can be applied from an aqueous solution to the paper by conventional process techniques, either by addition to the aqueous cellulose fiber slurry prior to the paper machine or by subsequent application through coating or impregnating a preformed paper stock. Thus, the additive should preferably be water-soluble or at least water-dispersible. Obviously, treatment to improve the electroconductivity of a photoconductive copy paper should not materially impair other important properties of the copy paper, such as shelf stability, the clarity and sharpness of reproduction, absence of excessive objectionable odor, permanence of the printed image, etc.

As described by Silvernail and Zembal in United States Patent 3,011,918, treatment of paper with polymers containing polymerized vinylbenzyl quaternary ammonium moieties results in an appreciable increase in the electroconductivity of the coated paper at a low relative humidity. Commercial acceptance of this polymer, however, has been severely hindered by a tendency of the treated paper to develop in time a strong and objectionable amine-like odor.

It has now been discovered that enhanced and advantageous properties are obtained by treating paper to incorporate therewith a small amount of a water-dispersible cationic (methylenediphenyl ether) polymer comprising in major proportion a plurality of diphenyl ether moieties linked with methylene bridges and having an average of at least 0.05 cationic groups (Z) per diphenyl ether moiety. The cationic groups (Z) are further characterized as amino, ammonium and/or sulfonium groups chemically bonded to the diphenyl ether moieties of the polymer matrix as substituents of the formula:

—CH$_2$Z

Thus, the cationic (methylenediphenyl ether) polymer comprises in major proportion a plurality of moieties of the general formula:

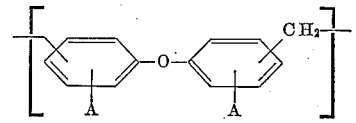

wherein each A is —H or —CH$_2$Z, and Z is an amino, ammonium or sulfonium group.

Many advantages accrue from the treatment of paper with a soluble (methylenediphenyl ether) polymer as described herein. Since the characteristics of the treated paper depend in part on the particular polymer employed, the great range of possible cationic substitution permits considerable flexibility to meet the demands of a variety of applications. As described in greater detail below, the nature and the number of cationic groups can be easily varied. For example, primary, secondary, tertiary amino or quaternary ammonium groups can be used as well as mixtures thereof. In some applications polymers containing both ammonium and sulfonium groups are particularly advantageous. Also, the degree of substitution, i.e., the average number of cationic groups per diphenyl ether moiety, can be varied from as low as 0.05 to 2 or more.

Paper having a variety of enhanced properties can be obtained by appropriate treatment with the cationic (methylenediphenyl ether) polymers. Thus, increased wet and dry strengths can be obtained without appreciable alteration of the sizing characteristics by treatment with sulfonium polymers. Furthermore, the resulting paper has a softer "hand" than paper treated with conventional wet-strength resins. Incorporation of a small amount of a quaternary ammonium polymer is highly effective in giving increased electroconductivity at low humidity. By use of a (methylenediphenyl ether) polymer containing other amino or sulfonium groups in addition to quaternary ammonium groups, not only are the electroconductive properties of the paper enhanced, but also the polymer is fixed more strongly to the cellulose fibers so that leaching or bleeding of the electroconductive polymer does not occur in subsequent treatment of the paper with other aqueous solutions. Such water desensitization is also highly desirable for many other applications.

Still other advantages result from the use of cationic (methylenediphenyl ether) polymers. Since the (methylenediphenyl ether) matrix is particularly resistant to thermal and oxidative attack, these cationic derivatives have good chemical and thermal stability. The odor problem which was particularly severe with the vinylbenzyl quaternary trimethylammonium polymer described by Silvernail and Zembal is appreciably reduced with the quaternary ammonium (methylenediphenyl ether) polymers. In addition, for a given degree of aromatic substitution, the cationic capacity of the (methylenediphenyl ether) moiety is greater than that of the vinylbenzyl polymer. Yet another advantage is the ease with which these cationic diphenyl ether polymers can be prepared from readily available and relatively inexpensive raw materials. Thus, there are important and signficant process advantages and economies in the production of these cationic polymers and their application to paper.

SOLUBLE CATIONIC (METHYLENEDIPHENYL ETHER) POLYMERS

The soluble cationic polymers which are effective in the present invention are preferably prepared by the condensation polymerization of a halomethyldiphenyl ether to give a soluble (methyldiphenyl ether) polymer containing residual halomethyl groups. By reaction of residual halomethyl groups attached to the polymer matrix with suitable organic amines, sulfides, or mixtures thereof, the desired cationic diphenyl ether polymers are obtained.

In United States Patent 2,911,380, Doedens describes the condensation polymerization of halomethyldiphenyl ethers to give an insoluble resinous polymeric foam. The polymerization involves the condensation between a reactive halomethyl group of a halomethyldiphenyl ether with a second diphenyl ether moiety to form a methylene bridge with concurrent elimination of hydrogen halide.

As described by G. R. Geyer, M. J. Hatch, and H. B. Smith in a pending United States patent application, Serial No. 299,073, filed July 31, 1963, it is possible by careful control of the polymerization conditions to obtain a (methylenediphenyl ether) polymer containing residual halomethyl groups which is soluble in such nonpolar organic solvents as toluene and dioxane. These soluble diphenyl ether condensation polymers are further characterized as comprising in major proportion a plurality of moieties of the general formula:

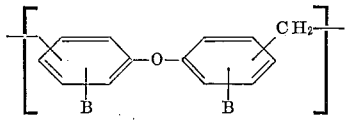

wherein each B is independently hydrogen, —CH$_2$Br, or —CH$_2$Cl. The residual halomethyl groups of such soluble polymers react readily with suitable amines or sulfides to form cationic groups (Z) which are bonded to the polymer as substituents of the general formula:

$$-CH_2Z$$

With an average of more than about 0.3 hydrophilic amino, ammonium or sulfonium groups per diphenyl ether moiety, the resulting cationic polymer is generally completely water-soluble, i.e., dispersible in water to provide a visually homogeneous and transparent solution infinitely dilutable with water. With a lower degree of cationic substitution, the polymer disperses in water to give a hazy or opaque mixture.

As further described by Geyer, Hatch, and Smith, cationic derivatives useful in the process of the invention described herein can be obtained by reaction of an intermediate soluble diphenyl ether polymer having residual halomethyl groups with:

(1) Amines of the general formula:

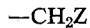

wherein R$_1$, R$_2$, and R$_3$ individually are selected from the group consisting of hydrogen; C$_1$–C$_{18}$ alkyl, cycloalkyl, aryl, and aralkyl hydrocarbon groups; C$_1$–C$_4$ monohydroxyalkyl groups; and C$_2$–C$_4$ dihydroxyalkyl groups; subject to the limitation that the amine contain not more than one aromatic group;

(2) Alkylene polyamines of the general formula:

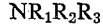

wherein $a$ in an integer from 2 to 6 inclusive and $b$ is an integer from 1 to 4;

(3) Monocyclic amines consisting of a 5 or 6 membered ring containing from 1 to 2 heterocyclic nitrogen atoms therein and C$_1$–C$_4$ alkyl derivatives thereof; and (4) Heterocyclic polyamines of the group consisting of hexamethylenetetramine and C$_1$–C$_4$ trialkylcyclotrimethylenetriamines.

Typical of the tertiary amines which are particularly desirable in the preparation of the quaternary ammonium derivatives are trimethylamine, tri-n-butylamine, dimethylaminoethanol, dimethylisopropanolamine, dimethylbenzylamine, dimethylaniline, dimethylcyclohexylamine, N,N-dimethylamino-1,2-propanediol, methyldiethanolamine, and dimethyldodecylamine, as well as such tertiary heterocyclic amines as pyridine, 2,4-lutadiene, N-methyl morpholine, pyrrole, N-ethylpiperidine, hexamethylenetetramine, and trialkyltrimethylenetriamines obtained by the condensation of formaldehyde and a C$_1$–C$_4$ primary aliphatic amine. Representative of the variety of primary and secondary amines which can be used are methylamine, diisopropylamine, methylethanolamine, N-methylaniline, piperidine, 2,5-dimethylpiperazine, 2-aminoethanol, isopropanolamine, and such alkylene polyamine as ethylenediamine, propylenediamine, 1,6-diaminohexane, diethylenetriamine, etc.

Still other cationic derivatives useful in the invention described herein can be prepared by reacting the soluble intermediate halomethyldiphenyl ether polymer with an organic sulfide. Particularly desirable are the sulfonium derivatives prepared from sulfides of the general formula:

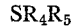

wherein R$_4$ and R$_5$ individually are members of the class consisting of: (1) C$_1$–C$_6$ alkyl groups, (2) C$_2$–C$_4$ monohydroxyalkyl groups, (3) C$_1$–C$_6$ haloalkyl groups, (4) C$_7$–C$_{12}$ aralkyl groups, and (5) —C$_m$H$_{2m}$COOQ wherein $m$ is an integer from 1 to 4 and Q is selected from the group consisting of hydrogen, alkali metal cations, and C$_1$–C$_6$ alkyl groups. It is generally preferable to use an organic sulfide wherein one of the substituent groups contains not more than 2 carbon atoms such as dimethylsulfide, n-butylmethylsulfide, 2-(methylmercapto)ethanol, bis-(2-hydroxyethyl)sulfide and methyl 3-methylthiopropionate.

Furthermore, it is evident that by proper choice of reagents, mole ratios, and reaction conditions, it is possible to prepare products containing more than one type of cationic group such as a polymer having both quaternary ammonium and sulfonium groups, quaternary ammonium and tertiary amino or ammonium groups, etc. Such mixed cationic derivatives are highly desirable in certain applications.

As prepared from an intermediate halomethyldiphenyl ether condensation polymer, the quaternary ammonium and sulfonium derivatives are normally obtained as a chloride or bromide salt, and the non-quaternary amino derivatives as an amine hydrochloride or hydrobromide. If desired, such salts can be converted in conventional manner by standard ion exchange techniques to salts having other anions such as sulfate, bisulfate, nitrate, carbonate, acetate, or citrate. The amine hydrohalides can be similarly converted to other acid salts or by treatment with a suitable base to the corresponding free amine.

The invention does not depend upon the particular method employed for the synthesis of the cationic polymer and alternate processes can be used. In general the cationic polymers are prepared as an aqueous solution or concentrate which can be diluted as required. If necessary, the solid cationic polymer can be isolated by conventional means such as solvent or salt induced precipitation, evaporation of the solvent, etc.

PAPER TREATMENT

In the practice of the present invention, paper can be treated with the cationic (methylenediphenyl ether) polymer in numerous ways. Because of its cationic nature, the polymer is strongly attracted to the paper fibers. Thus it can be effectively added to a dilute pulp slurry at the beater, headbox, or other suitable stage prior to forming the cellulose web. Alternately the desired cationic polymer can be applied to preformed paper stock by coating, dipping, brushing, calendering or other similar conventional techniques for impregnating or coating paper stock. In the preparation of an electrographic printing paper, the electroconductive polymer is preferably applied to the base paper stock by dipping the paper in an aqueous solution or dispersion of the polymer. The treated paper is then dried by calendering, oven-drying, or other standard means.

For convenience in handling and metering, the cationic diphenyl ether polymer is generally employed as an aqueous solution or dispersion containing from about 5 to 30 weight percent polymer solids. Only a small amount of the cationic polymer, generally less than 10 percent by weight of the dry paper or paper pulp, is required to obtain an enhancement of the properties of the treated paper. As little as 0.05 weight percent of these additives gives a noticeable improvement. However to achieve optimum properties, it is in practice generally preferred to incorporate from 1 to 8 weight percent of a soluble (methylenediphenyl ether) polymer having an average of at least 0.3 cationic groups per diphenyl ether moiety. Because of its cationic nature, pickup of the polymer even when added to a dilute slurry of paper pulp is quite efficient.

Although the soluble cationic (methylenediphenyl ether) polymers described herein are generally effective in improving the electroconductivity of treated paper as required for electrographic printing by the Electrofax process, the quaternary ammonium derivatives are usually preferred. Particularly desirable are the quarternary ammonium derivatives prepared from tertiary methyl and dimethyl alkylamines.

Treatment of paper stock with the cationic (methylenediphenyl ether) polymers will provide the needed electroconductive properties for an electrographic copy paper. Such treated paper is particularly desirable for electrographic printing by the Electrofax process at a relative humidity of less than 25 percent. In practice the cationic (methylenediphenyl ether) polymer is preferably applied to one or both sides of a preformed paper stock as an aqueous solution using conventional techniques. The exact loading to achieve the desired electroconductive properties is easily established by a few simple trials.

In the Electrofax process, it is also necessary to have a photoconductive coating on the copy paper. Frequently, it is desirable to apply this photoconductive coating from an aqueous solution after the treatment with an electroconductive additive. Since the electroconductive additives described herein are water-soluble, particularly the preferred quaternary ammonium derivatives, they tend to leach from the paper stock and to migrate into the wet photoconductive coating before it is dried. This results in decreased printability of the paper and inferior reproduction. Hence, the further discovery that the quaternary electroconductive materials described herein can be made less water sensitive after initial application to the paper by the presence of other and different cationic groups in the polymer structure is of great importance.

To achieve this water desensitization of the applied electroconductive polymer, it is necessary that at least 5 to 10 percent and preferably 10 to 20 percent or more of the cationic groups of the diphenyl ether polymer be of a type capable of interacting with the treated paper to fix or insolubilize the electroconductive polymer. For example, a particularly effective material is obtained by reacting a soluble diphenyl ether polymer containing an average of about 1.6 residual chloromethyl groups per diphenyl ether moiety with 15 mole percent of bis-(2-hydroxyethyl)sulfide based on the total chloromethyl content of the polymer, and then with sufficient trimethylamine to quaternize the residual unreacted chloromethyl groups.

In addition to sulfonium groups, quaternary ammonium groups based on hexamethylenetetramine also cause this desired water desensitization. Furthermore, the presence of amino groups or amine salts derived by reaction of a portion of the halomethyl groups of the intermediate halomethyldiphenyl ether polymer with simple aliphatic amines such as monomethyl- or dimethylamine also reduces the ease with which the applied polymer is removed from the treated paper. The mechanism of this water desensitization is not understood, but there is evidence that at least with the sulfonium and hexamethylenetetramine derivatives, chemical interaction of these derivatives with the cellulose fibers occurs when the treated paper is dried.

The utility of the soluble cationic (methylenediphenyl ether) polymers described herein as additives for paper and other cellulosic products is not limited to improving the electroconductivity of the treated products. It has been further discovered that these additives also enhance other desirable properties such as increasing the wet and dry strength of the treated products. Paper treated with these additives has improved softness or "hand" as compared with conventional polyamide or melamine wet strength additives.

In summary then, it has been discovered that treatment of cellulosic products with a soluble cationic (methylenediphenyl ether) polymer greatly enhances such properties as electroconductivity, wet strength and dry strength. Because of the latitude in the type and structure of the cationic derivatives which can be used, a wide range of enhanced properties can be obtained. The preferred cationic composition and the amount of additives required for any particular application is readily determined by laboratory tests as shown in the examples below.

In order that those skilled in the art may more fully understand the invention described herein, the following examples are presented by way of illustration without limitation of the invention thereto. Unless otherwsie stated, all parts and percentages are by weight.

*Example 1.—Soluble cationic (methylenediphenyl ether) polymers*

A. To a stirred solution of 2630 parts of chloromethyldiphenyl ether containing 31.5 wt. percent chlorine, an average of 2.70 chloromethyl groups per diphenyl ether moiety ($ClCH_2$—/DPE), and 2630 parts of 1,2-dichloroethane was added 16 parts of a 50% solution of anhydrous zinc chloride in methanol. Polymerization to a soluble diphenyl ether polymer was achieved by heating the resulting mixture at 65–70° C. for 21 hours. After washing with water to remove the catalyst and dissolved HCl there was obtained 3453 parts of a polymer solution containing 67.2% solids. A sample of the polymer, isolated by precipitation with excess methanol, was found to contain 21.7 wt. percent side chain chlorine or an average of about 1.60 $ClCH_2$—/DPE.

B. To 200 parts of this polymer solution, containing 134.5 parts of the soluble chloromethyldiphenyl ether polymer, was added with stirring 195 parts of water containing 2.5 parts of sodium hydroxide and then 386 parts of 25% aqueous trimethylamine. The reaction temperature rose to about 45° C. After another 2 hours at 40–45° C. amination was complete as shown by analysis for ionic chloride. The aqueous product phase was separated and concentrated to remove traces of 1,2-dichloroethane and excess trimethylamine. The residual clear aqueous solution contained by weight 41.6% of a soluble quaternary trimethylammonium derivative of poly(methylenediphenyl ether). As a 20% aqueous solution this cationic product had a Brookfield viscosity of 17 cps. at 75° F. and a pH of 7.0.

C. In a manner similar to that described in 1A above, a variety of chloromethyldiphenyl ethers having an average of from about 1.0 to 3.5 chloromethyl groups per molecule have been polymerized to give soluble polymers having an average of from about 0.05 to 2.5 residual chloromethyl groups per diphenyl ether moiety. Bromomethyldiphenyl ethers polymerize similarly.

In preparing cationic derivatives of the soluble halomethyldiphenyl ether polymers by the general process described in 1B, a temperature of from 20° to 45° C. is usually preferred for amination whereas a temperature in the range of from 30° to 70° C. is often more desirable for reaction of the residual halomethyl groups with organic sulfides. In preparing the mixed cationic polymers, an amount of the less reactive reagent, calculated on the basis of the residual halomethyl content and the desired degree of substitution, is usually added first and allowed to react to the desired degree. Then a sufficient amount of the more reactive reagent is added to convert the remaining halomethyl groups to cationic groups.

Typical examples of the soluble cationic diphenyl ether polymers which have been prepared by this general procedure are given in Tables 1 and 2. Except for the dimethyldodecylamine derivative which gave a cloudy dispersion in water but was completely soluble in aqueous methanol, these cationic derivatives all were at least 1% soluble in water at room temperature.

*Example 2.—Electroconductivity tests*

As a preliminary measure of the effectiveness of various cationic diphenyl ether polymers in improving the electroconductivity of paper, the surface resistivity of treated test sheets was determined by the method described in ASTM D–257–61. Although this test is sensitive to slight variations in procedure, data obtained in concurrent tests was generally reproducible to within a factor of 10.

The test procedure involved coating a weighed, standard test sheet of 51 lbs./ream bleached sulfite paper sized on one side with the desired cationic polymer applied generally as a 25% aqueous solution using a standard wire-wound Meyer rod applicator to give about a 7–8% polymer pickup on a dry weight basis. The treated sheets were dried for 5 minutes in an oven at 230° F., weighed and cut into test strips. The test strips were then conditioned at the desired test humidity for 24 hours at room temperature (about 23° C.) before measuring the surface resistivity.

Typical surface resistivity data for paper treated with various soluble cationic diphenyl ether polymers prepared as described in Example 1 are given in Tables 1 and 2. The cationic polymers employed are characterized in the tables by the residual chloromethyl content of the intermediate polymer expressed as percent side-chain chlorine, by the amine and/or sulfide used in preparing the cationic derivative, and by the average number of cationic groups (Z) per diphenyl ether moiety (av. Z/DPE). This latter ratio was calculated from the halomethyl content of the intermediate polymer and the mole ratio of the amine and/or sulfide reactants.

TABLE 1.—ELECTROCONDUCTIVITY OF PAPER TREATED WITH SOLUBLE CATIONIC (METHYLENEDIPHENYL ETHER) POLYMERS

| | Cationic (Methylenediphenyl Ether) Polymer | | | Polymer Pickup, Percent | Surface Resistivity, ohms | | |
|---|---|---|---|---|---|---|---|
| No. | Wt. Percent Cl [a] | Amine and/or Sulfide | Av. Z/DPE [b] | | 7% RH | 33% RH | 57.5% RH |
| 1-1 | 8.8 | Trimethylamine | 0.50 | 7.0 | $4.8 \times 10^{10}$ | $7.6 \times 10^8$ | $5.0 \times 10^7$ |
| 1-2 | 21.8 | do | 1.60 | 7.8 | $3.0 \times 10^9$ | $2.3 \times 10^5$ | $1.4 \times 10^7$ |
| 1-3 | 21.8 | Dimethylaminoethanol | 1.60 | 7.4 | $4.5 \times 10^{11}$ | $4.2 \times 10^9$ | $1.0 \times 10^8$ |
| 1-4 | 21.8 | Tri-n-propylamine | 1.60 | 9.3 | $1.4 \times 10^{12}$ | $4.1 \times 10^9$ | $6.0 \times 10^7$ |
| 1-5 | 23.3 | Tri-n-butylamine | 1.75 | 12.4 | $1.0 \times 10^{13}$ | $6.0 \times 10^{10}$ | $4.5 \times 10^8$ |
| 1-6 | 23.3 | N,N-dimethylaniline | 1.75 | 5.4 | $1.4 \times 10^{11}$ | $5.4 \times 10^9$ | $2.7 \times 10^8$ |
| 1-7 | 21.0 | Dimethyldodecylamine | 1.50 | 7.2 | $4.2 \times 10^{12}$ | $4.2 \times 10^9$ | $1.1 \times 10^8$ |
| 1-8 | 21.0 | Pyridine | 1.50 | 6.3 | $1.7 \times 10^4$ | $9.0 \times 10^8$ | $5.3 \times 10^7$ |
| 1-9 | 26.9 | Thiodiglycol | 2.20 | 6.3 | $1.2 \times 10^{12}$ | $1.0 \times 10^{10}$ | $1.9 \times 10^8$ |
| Untreated control test sheets | | | | | [c] $)(8 \times 10^{13})$ | [c] $> (8 \times 10^{13})$ | $1.2 \times 10^{11}$ |

[a] Wt. percent side chain chlorine in the intermediate chloromethyldiphenyl ether polymer.
[b] Av. number of cationic groups per diphenyl ether moiety.
[c] Greater than maximum instrument reading of $8 \times 10^{13}$ ohms.

TABLE 2.—ELECTROCONDUCTIVITY OF PAPER TREATED WITH SOLUBLE MIXED CATIONIC (METHYLENEDIPHENYL ETHER) POLYMERS

| | Cationic (Methylenediphenyl Ether) Polymer | | | Polymer Pickup, Percent | Surface Resistivity, ohms | | |
|---|---|---|---|---|---|---|---|
| No. | Wt. Percent Cl [a] | Amine and/or Sulfide | Av. Z/DPE [b] | | 7% RH | 33% RH | 57.5% RH |
| 2-1 | 24.8 | Trimethylamine + Dimethylamine | 0.95 / 0.95 | 6.4 | $3.6 \times 10^9$ | $2.4 \times 10^5$ | $2.9 \times 10^7$ |
| 2-2 | 24.8 | Trimethylamine + Monomethylamine | 1.24 / 0.66 | 7.2 | $7.4 \times 10^9$ | $3.0 \times 10^5$ | $4.3 \times 10^7$ |
| 2-3 | 18.1 | Trimethylamine + Thiodiglycol | 0.75 / 0.50 | 13.5 | $1.4 \times 10^{10}$ | $2.7 \times 10^5$ | $5.6 \times 10^6$ |
| 2-4 | 21.3 | Trimethylamine + Hexamethylenetetramine | 1.04 / 0.51 | 8.3 | $3.4 \times 10^{10}$ | $8.4 \times 10^5$ | $6.0 \times 10^7$ |
| 2-5 | 21.8 | Hexamethylenetetramine + Thiodiglycol | 1.23 / 0.37 | 9.6 | $1.4 \times 10^{12}$ | $9.0 \times 10^9$ | $2.3 \times 10^8$ |
| Untreated control test sheet | | | | | [c] $)(8 \times 10^{13})$ | [c] $> (8 \times 10^{13})$ | $1.2 \times 10^{11}$ |

[a] Wt. percent side chain chlorine in the intermediate chloromethyldiphenyl ether polymer.
[b] Av. number of cationic groups per diphenyl ether moiety.
[c] Greater than maximum instrument reading of $8 \times 10^{13}$ ohms.

It is evident from the data in Tables 1 and 2 that treatment with these soluble cationic (methylenediphenyl ether) polymers is effective in reducing the surface resistivity of the paper, i.e., increases its electroconductivity. The degree of effectiveness is influenced by such factors as the cationic content of the polymer, the amount of polymer incorporated into the paper (the polymer pickup), and the structure of the cationic groups. Under the test conditions given in these tables, the additives decreased the surface resistivity by a factor of $10^3$–$10^4$ at 57.5% RH, at least $10^3$–$10^5$ at 33% RH and more than $10^1$–$10^4$ at 7% RH.

Example 3.—Electrofax test sheets

Using a 20% aqueous solution of the test electroconductive polymer and a standard wire-wound Meyer rod coating applicator, test sheets of 40 lb. paper stock prepared for use in the Electrofax process were coated on one side with about 1.0–1.5 lbs. of electroconductive polymer/3300 ft.$^2$ of paper surface or about 2.5–4.0 wt. percent incorporated polymer on a dry weight basis. The reverse side of each sheet was then topcoated in a similar manner with a photoconductive coating of zinc oxide in a styrene-butadiene latex binder to give a uniform top coating of about 22 lbs./3300 ft.$^2$ on a dry weight basis. After aging these test sheets for about 24 hrs. at the desired test humidity level, prints were then made by the Electrofax process using a standard test pattern and a commercial liquid toner. The quality of each print was determined by careful comparison with control prints. Typical results are given in Table 3.

slurry of unbleached softwood pulp having a Canadian standard freeness of 600 ml., the desired amount (0, 0.25, 0.50 or 1.0 wt. percent on a dry pulp basis) of wet strength additive followed by forming a handsheet, drying it for 3 minutes at 218° F., and post-curing in a forced air oven at about 230° F. for a half-hour. The dried sheets had a thickness of about 0.1 mm. and a basis weight of about 2 g./m.$^2$. Tensile strength data was obtained with an Instron test machine using a 95 mm. test span and standard 15 x 200 mm. test strips. The wet strength was determined using test strips immersed in water at room temperature for about a half-hour immediately before testing.

A. A comparison of the sulfonium (methylenediphenyl ether) polymer (Nos. 1–9, Table 1) as a wet and dry strength additive with several commercial paper additives is presented in Table 4. The sulfonium derivative is very similar in effectiveness to the polyamide-epichlorohydrin resin and is particularly suited for paper prepared at a neutral or slightly acidic pH.

TABLE 3.—ELECTROFAX TEST SHEETS

| Cationic DPE Polymer | | Test Results | | | | |
|---|---|---|---|---|---|---|
| | | Surface Resistivity, ohms | | Print Intensity | | |
| No. | Amine | 25% RH | 56% RH | 25% RH | 65% RH | Back-printing [a] | Bleeding |
| None | | $2.0 \times 10^{11}$ | $4.4 \times 10^9$ | Poor | Good | Intense | None. |
| 1–2 | Trimethylamine | $1.5 \times 10^9$ | $1.6 \times 10^7$ | Very good | Very good | None | Slight. |
| 1–3 | Dimethylaminoethanol | $5.2 \times 10^{10}$ | $5.3 \times 10^7$ | Excellent | do | do | Considerable. |
| 2–1 | Trimethylamine plus Di-methylamine. | $1.7 \times 10^8$ | $1.2 \times 10^6$ | Very good | do | do | None. |
| 2–4 | Trimethylamine plus Hexa-methylenetetramine. | $5.8 \times 10^9$ | $8.4 \times 10^6$ | do | do | do | Do. |

[a] At 25% RH.

The typical test results given in Table 3 show the improved electrographic printing obtained by treatment of the paper stock with the cationic (methylenediphenyl ether) polymers. Note that backprinting caused by insufficient electroconductivity was eliminated by treatment with the cationic polymers. Bleeding of the electroconductive polymer into the photoconductive coating as revealed by a spotty or mottled appearance of the printed sheet was particularly evident with the dimethylaminoethanol derivative. However as shown in Table 3 and in other similar tests, the presence of small amounts of non-quaternary cationic groups in the soluble diphenyl ether polymer immobilizes the electroconductive polymer thereby giving more uniform print quality.

Example 4.—Wet and dry strength additives

As a preliminary evaluation of utility as wet and/or dry strength additives, the Mullen burst strength test was used. The paper test sheets were prepared from an unbleached sulfite pulp treated to contain 1% of the test cationic polymer on a dry weight basis. Using the cationic sulfonium polymer described above (1–9) test sheets prepared at a pH of 4.5, 7.0 and 9.5 had in the standard Mullen test, dry burst factors ranging from 41.7 to 47.2 compared with untreated control sheets which had dry burst factors of from 32.2 to 34.5 for the same initial pH. Since any increase in dry strength greater than 10% of the untreated value is generally recognized as a material improvement, this cationic polymer is indeed an effective dry strength additive.

In a similar test with the same cationic sulfonium additive, wet burst factors ranging from 17.7 to 18.9 were observed with the treated paper whereas factors of only 1.2 to 1.3 were found for the untreated control sheets.

Example 5.—Tensile strength additives

Test sheets were prepared by adding to a 1% aqueous

TABLE 4.—WET AND DRY TENSILE DATA

| Additive [a] | Wet Tensile Breaking Length (meters) | | | Dry Tensile Breaking Length (meters) | | |
|---|---|---|---|---|---|---|
| | Parez 607 | Kymene 557 | DPE 1–9 | Parez 607 | Kymene 557 | DPE 1–9 |
| pH 5.0: | | | | | | |
| 0% | 25 | 25 | 25 | 4,230 | 4,230 | 4,230 |
| 0.25% | | 755 | 530 | | 5,560 | 4,630 |
| 0.5% | 390 | 1,510 | 1,460 | 4,180 | 6,600 | 6,360 |
| 1.0% | 1,380 | 2,120 | 2,140 | 5,190 | 6,970 | 6,980 |
| pH 7.0: | | | | | | |
| 0% | 14 | 14 | 14 | 4,760 | 4,760 | 4,760 |
| 0.25% | | 420 | 225 | | 5,200 | 4,710 |
| 0.5% | 130 | 1,030 | 885 | 3,860 | 5,580 | 5,380 |
| 1.0% | 950 | 1,770 | 1,695 | 6,350 | 7,180 | 6,930 |
| pH 9.0: | | | | | | |
| 0% | 20 | 20 | 20 | 4,930 | 4,930 | 4,930 |
| 0.25% | | 455 | 280 | | 5,060 | 5,570 |
| 0.5% | 205 | 930 | 725 | 4,490 | 5,630 | 5,280 |
| 1.0% | 330 | 1,880 | 1,885 | 4,160 | 7,640 | 6,250 |

[a] Parez 607—A melamine-formaldehyde resin from American Cyanamid. Kymene 557—A polyamide-epichlorohydrin resin from Hercules. DPE 1–9—Thiodiglycol derivative Nos. 1–9, Table 1.

B. In another series of tests, the effectiveness of mixed cationic (methylenediphenyl ether) polymers was examined. Test sheets were prepared concurrently using as additives a commercial polyamide resin, the cationic sulfonium resin (Nos. 1–9, Table 1) and two mixed cationic derivatives prepared from an intermediate chloromethyldiphenyl ether polymer containing 25.0% residual chlorine (1.95 $ClCH_2$—/DPE). These mixed cationic derivatives contained 1.75 cationic sulfonium groups derived from thiodiglycol and 0.20 cationic amino or ammonium groups derived respectively from diethanolamine and dimethyldodecylamine. Test results as shown in Table 5 indicate that the presence of diethanolamino groups decrease somewhat the activity as a wet-strength additive while maintaining fairly high activity as a dry-strength additive. On the other hand, incorporation of a few quaternary ammonium groups derived from dimethyldodecylamine improves the activity of the cationic sulfonium polymer as both a wet and dry strength additive.

TABLE 5.—WET AND DRY TENSILE DATA

| Additive [a] | Wet Tensile Breaking Length (meters) | | | | Dry Tensile Breaking Length (meters) | | | |
|---|---|---|---|---|---|---|---|---|
| | Kymene 557 | DPE 1-9 | DPE 5-1 | DPE 5-2 | Kymene 557 | DPE 1-9 | DPE 5-1 | DPE 5-2 |
| pH 5.0: | | | | | | | | |
| 0% | 127 | 127 | 127 | 127 | 3,520 | 3,520 | 3,520 | 3,520 |
| 0.5% | 1,270 | 1,020 | 990 | 1,300 | 4,360 | 3,140 | 3,570 | 4,860 |
| pH 7.0: | | | | | | | | |
| 0% | 214 | 214 | 214 | 214 | 3,580 | 3,580 | 3,580 | 3,580 |
| 0.25% | 670 | 560 | 260 | 850 | 3,880 | 4,470 | 3,710 | 3,530 |
| 0.5% | 1,370 | 1,660 | 800 | 1,860 | 5,450 | 5,710 | 3,380 | 4,540 |
| 1.0% | 2,000 | 2,630 | 1,820 | 2,400 | 5,880 | 6,000 | 5,980 | 6,200 |
| pH 9.0: | | | | | | | | |
| 0% | 187 | 187 | 187 | 187 | 4,350 | 4,350 | 4,350 | 4,350 |
| 0.5% | 960 | 530 | 520 | 1,290 | 5,360 | 5,420 | 5,620 | 5,410 |

[a] Kymene 557—A polyamide-epichlorohydrin resin from Hercules. DPE 1-9—Thiodiglycol derivative No. 1-9, Table 1. DPE 5-1—Thiodiglycol-diethanolamine derivative. DPE 5-2—Thiodiglycol-dimethyldodecylamine derivative.

Example 6.—Effect on paper softness

Many commercial wet and/or dry strength additives for paper give increased harshness and stiffness, a harder "hand," to the finished paper which is undesirable for products such as facial tissues. As a measure of this factor a compound modulus of compression and tensile was determined using samples of the same test sheets described in Example 5A.

The following test procedure was used. The weight and average thickness of the individual 15 x 200 mm. test strips were measured. Then the test strips separately were clamped in a flat horizontal position with 3.0 inches of the strip extending beyond the edge of the clamp. The deflection of the unsupported tip of the test strip from the horizontal plane of the clamped end was then measured. With each strip the measurement was made with both the felt and the wire side of the paper uppermost. The compound modulus of compression and tension is then calculated using the formula:

$$E = \frac{3}{2} \frac{Wl^3}{bz^3\Delta}$$

wherein $E$ = compound modulus of compression and tensile (g./cm.$^2$),
$W$ = weight of the hanging strip (g.),
$l$ = length of the hanging strip (cm.),
$b$ = width of the hanging strip (cm.),
$z$ = av. thickness of the hanging strip (cm.), and
$\Delta$ = max. deflection of the hanging strip (cm.).

Typical compound modulus data are given in Table 6. Although there is some scatter in the results, it is evident that the sulfonium (methylenediphenyl ether) polymer gives a somewhat softer paper than the polyamide resin prepared under acid, neutral or alkaline conditions and the melamine resin under acid and neutral conditions. Other cationic (methylenediphenyl ether) polymers give similar results.

TABLE 6.—EFFECT OF WET AND DRY STRENGTH ADDITIVES ON PAPER SOFTNESS

| Additive [a] | Compound Modulus, g./cm.$^2$ | | |
|---|---|---|---|
| | Parez 607 | Kymene 557 | DPE 1-9 |
| pH 5.0: | | | |
| 0% | 1.39×10$^7$ | 1.39×10$^7$ | 1.39×10$^7$ |
| 0.5% | 1.67×10$^7$ | 1.65×10$^7$ | 1.55×10$^7$ |
| 1.0% | 1.71×10$^7$ | 1.58×10$^7$ | 1.45×10$^7$ |
| pH 7.0: | | | |
| 0% | 1.48×10$^7$ | 1.48×10$^7$ | 1.48×10$^7$ |
| 0.5% | 1.60×10$^7$ | 1.50×10$^7$ | 1.34×10$^7$ |
| 1.0% | 1.89×10$^7$ | 1.42×10$^7$ | 1.40×10$^7$ |
| pH 9.0: | | | |
| 0% | 1.62×10$^7$ | 1.62×10$^7$ | 1.62×10$^7$ |
| 0.5% | 1.74×10$^7$ | 1.90×10$^7$ | 1.74×10$^7$ |
| 1.0% | 1.53×10$^7$ | 1.56×10$^7$ | 1.63×10$^7$ |

[a] Parez 607—A melamine-formaldehyde resin from American Cyanamid. Kymene 557—A polyamide-epichlorohydrin resin from Hercules. DPE 1-9—Thiodiglycol derivative No. 1-9, Table 1.

I claim:
1. A cellulosic product comprising cellulose fibers having incorporated therein at least 0.05 weight percent on a dry pulp basis of a soluble cationic (methylenediphenyl ether) polymer having an average of at least 0.05 cationic groups per diphenyl ether moiety, said cationic groups being bonded to the aromatic nuclei of the polymer by a methylene group.

2. The product of claim 1 wherein the cationic groups are selected from the class consisting of amino, ammonium, quaternary ammonium, and sulfonium groups and mixtures thereof.

3. The product of claim 2 wherein the cationic groups are quaternary ammonium groups.

4. The product of claim 3 wherein the cationic groups are trimethylammonium groups.

5. The product of claim 3 wherein the cationic groups are a mixture of trimethylammonium and hexamethylenetetraminium groups.

6. The product of claim 2 wherein the cationic groups are a mixture of trimethylammonium and dimethylammonium groups.

7. The product of claim 2 wherein the cationic groups are a mixture of trimethylammonium and bis-(2-hydroxyethyl)sulfonium groups.

8. The product of claim 2 wherein the cationic groups are a mixture of dimethyldodecylammonium and bis-(2-hydroxyethyl)sulfonium groups.

9. The product of claim 2 wherein the cationic groups are bis-(2-hydroxyethyl)sulfonium groups.

10. A paper product having a printing surface adapted for electrographic printing having incorporated therein from about 0.05 to 10.0 weight percent on a dry pulp basis of a soluble cationic (methylenediphenyl ether) polymer having the cationic groups bonded to the aromatic nuclei of the polymer by a methylene group, said cationic polymer having an average of at least 0.05 quaternary ammonium groups per diphenyl ether moiety.

11. The product of claim 10 wherein the quaternary ammonium groups of the soluble cationic (methylenediphenyl ether) polymer are trimethylammonium groups.

12. The product of claim 10 wherein the soluble cationic (methylenediphenyl ether) polymer has in total an average of from 0.3–2.5 cationic groups per diphenyl ether moiety.

13. The product of claim 12 wherein from 30 to 95 percent of the cationic groups are quaternary ammonium groups and the remaining cationic groups are individually selected from the class consisting of amino, ammonium, and sulfonium groups.

14. The product of claim 12 wherein from 30 to 95 percent of the cationic groups are quaternary trimethylammonium groups and the remaining cationic groups are dimethylammonium groups.

15. The product of claim 12 wherein from 30 to 95 percent of the cationic groups are quaternary trimethylammonium groups and the remaining cationic groups are bis-(2-hydroxyethyl)sulfonium groups.

16. A method for the manufacture of electroconductive paper which comprises applying an aqueous solution of a water-soluble cationic (methylenediphenyl ether) polymer, said polymer having an average of at least 0.3 quaternary ammonium group per diphenyl ether moiety, to a paper stock so that there is incorporated therein from about 0.05 to 10.0 weight percent on a dry pulp basis of said polymer, and thereafter drying the paper.

17. A cellulosic product having improved wet and dry strength properties having incorporated therein from about 0.05 to 10.0 weight percent on a dry pulp basis of a soluble cationic (methylenediphenyl ether) polymer having an average of at least 0.3 sulfonium groups per diphenyl ether moiety, said sulfonium groups being bonded to the aromatic nuclei of the polymer by a methylene group.

18. The product of claim 17 wherein the cationic groups are bis-(2-hydroxyethyl)sulfonium groups.

19. The product of claim 17 wherein from 30 to 95 percent of the cationic groups are bis-(2-hydroxyethyl)sulfonium groups and the remaining cationic groups are dimethyldodecylammonium groups.

20. A method for the manufacture of paper having improved wet and dry strength which comprises adding to a paper stock slurry from about 0.05 to 10.0 weight percent on a dry pulp basis of a soluble cationic (methylenediphenyl ether) polymer, said cationic polymer having an average of at least 0.3 sulfonium group per diphenyl ether moiety, and thereafter forming a paper sheet and drying it.

References Cited by the Examiner
UNITED STATES PATENTS

| | | | |
|---|---|---|---|
| 2,499,215 | 2/1950 | De Benneville et al. | 260—52 |
| 2,884,057 | 4/1959 | Wilson et al. | 162—168 |
| 3,011,918 | 12/1961 | Silvernail et al. | 162—138 |
| 3,015,605 | 1/1962 | Jen et al. | 162—168 |

References Cited by the Applicant
UNITED STATES PATENTS

| | | |
|---|---|---|
| 2,499,215 | 2/1950 | De Benneville. |
| 2,884,057 | 4/1959 | Wilson. |
| 2,911,380 | 11/1959 | Doedens. |
| 3,011,918 | 12/1961 | Silvernail et al. |
| 3,015,605 | 1/1962 | Jen. |

DONALL H. SYLVESTER, *Primary Examiner.*